(12) United States Patent
Sakamoto

(10) Patent No.: US 9,457,415 B2
(45) Date of Patent: Oct. 4, 2016

(54) WATER REMOVING METHOD, OPTICAL FIBER SOLDERING METHOD, AND SEMICONDUCTOR LASER MODULE MANUFACTURING METHOD

(71) Applicant: FUJIKURA LTD., Tokyo (JP)

(72) Inventor: Akira Sakamoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 225 days.

(21) Appl. No.: 14/478,383

(22) Filed: Sep. 5, 2014

(65) Prior Publication Data

US 2014/0374468 A1 Dec. 25, 2014

Related U.S. Application Data

(63) Continuation of application No. PCT/JP2012/081358, filed on Dec. 4, 2012.

(30) Foreign Application Priority Data

Mar. 9, 2012 (JP) ................................. 2012-053766

(51) Int. Cl.
*B23K 1/20* (2006.01)
*G02B 6/42* (2006.01)
*F26B 3/28* (2006.01)
*F26B 3/30* (2006.01)

(52) U.S. Cl.
CPC . *B23K 1/20* (2013.01); *F26B 3/28* (2013.01); *F26B 3/30* (2013.01); *G02B 6/4238* (2013.01)

(58) Field of Classification Search
CPC ......... B23K 1/0016; B23K 1/20; F26B 3/28; F26B 3/30; G02B 6/4238
See application file for complete search history.

(56) References Cited

U.S. PATENT DOCUMENTS

| | | | |
|---|---|---|---|
| 3,932,184 A | 1/1976 | Cohen et al. | |
| 4,380,365 A | 4/1983 | Gross | |
| 4,810,054 A * | 3/1989 | Shinbori | G02B 6/2551 219/121.46 |
| 6,832,861 B2 | 12/2004 | Kragl | |
| 2003/0108304 A1 | 6/2003 | Ziari et al. | |
| 2011/0242835 A1 | 10/2011 | Masuko | |
| 2012/0026456 A1 | 2/2012 | Nishimoto et al. | |
| 2012/0234458 A1* | 9/2012 | Yoda | H01L 24/83 156/64 |

FOREIGN PATENT DOCUMENTS

| | | |
|---|---|---|
| EP | 0005683 A2 | 11/1979 |
| EP | 0579439 A1 | 1/1994 |

(Continued)

OTHER PUBLICATIONS

Extended European Search Report dated Apr. 22, 2015, issued in corrseponding European application No. 12870757.7 (5 pages).

(Continued)

*Primary Examiner* — Kiley Stoner
*Assistant Examiner* — Carlos Gamino
(74) *Attorney, Agent, or Firm* — Westerman, Hattori, Daniels & Adrian, LLP

(57) ABSTRACT

A moisture removing method disclosed removes moisture contained in a dielectric film provided on one end surface of an optical fiber. This moisture removing method causes near infrared light to enter the optical fiber through the other end surface to heat moisture in the dielectric film with use of the near infrared light.

6 Claims, 3 Drawing Sheets

(56) References Cited

FOREIGN PATENT DOCUMENTS

| JP | 60032018 A | * | 2/1985 |
|---|---|---|---|
| JP | 05-14157 U | | 2/1993 |
| JP | 05-323103 A | | 12/1993 |
| JP | 2009-251167 A | | 10/2009 |

OTHER PUBLICATIONS

Notification of Transmittal of Translation of the International Preliminary Report on Patentability (Form PCT/IB/338) of International Application No. PCT/JP2012/081358 mailed Sep. 18, 2014, with Forms PCT/ISA/237 and PCT/ISA/210 (8 pages).

* cited by examiner ically accelerate discoloration of the resin coating for the
WATER REMOVING METHOD, OPTICAL FIBER SOLDERING METHOD, AND SEMICONDUCTOR LASER MODULE MANUFACTURING METHOD This application is a Continuation of PCT International Application No. PCT/JP2012/081358 filed in Japan on Dec. 4, 2012, which claims the benefit of Patent Application No. 2012-053766 filed in Japan on Mar. 9, 2012, the entire contents of which are hereby incorporated by reference.

TECHNICAL FIELD

The present invention relates to a method for removing moisture contained in a dielectric film provided on an end surface of an optical fiber. The present invention further relates to a method for soldering an optical fiber and a method for producing a semiconductor laser module each of which methods involves the moisture removing method.

BACKGROUND ART

An optical fiber may have an end surface provided with a dielectric film. A typical example of such a dielectric film is an anti-reflection film for preventing the end surface from reflecting light intended to enter the optical fiber.

A semiconductor laser module, for example, often includes an optical fiber having an end surface provided with such an anti-reflection film. A semiconductor laser module is a light source device for use as, for example, an excitation light source for a fiber laser or fiber amplifier, and includes a semiconductor laser element for generating laser light and an optical fiber for transmitting the laser light. A semiconductor laser module is arranged such that its optical fiber has a light entry end surface facing the light emission end surface of the semiconductor laser element, the light entry end surface being provided with an anti-reflection film so that laser light emitted by the semiconductor laser element enters the optical fiber efficiently.

A dielectric film has the property of adsorbing moisture present in the environment. In a case where a dielectric film is used as an optical component such as an anti-reflection film, it is important to prevent such moisture adsorption. This is because a dielectric film changes its optical property when it has adsorbed moisture. Patent Literatures 1 and 2, for example, each publicly disclose a technique for preventing such moisture adsorption.

Patent Literature 1 discloses a technique of mixing a fluorine compound in the top layer of an optical multilayer film (dielectric multilayer film) to prevent the optical multilayer film from adsorbing moisture. Patent Literature 2 discloses a technique of reducing the distance between particles of the film material of the top layer of a dielectric multilayer film to a distance smaller than a water molecule to prevent the dielectric multilayer film from adsorbing moisture.

CITATION LIST

Patent Literature 1
Japanese Patent Application Publication, Tokukaihei, No. 5-323103 A (Publication Date: Dec. 7, 1993)
Patent Literature 2
Japanese Patent Application Publication, Tokukai, No. 2009-251167 A (Publication Date: Oct. 29, 2009)

SUMMARY OF INVENTION

Technical Problem

Solder is widely used as a means of fixing an optical fiber to another member. For production of a semiconductor laser module, for instance, solder is used to fix an optical fiber to a housing of the semiconductor laser module (to be more precise, to the bottom plate of such a housing or to a submount fixed to the bottom plate). In a case where an optical fiber is to be soldered to another member, a metallic coating is formed in advance on the side surface of the optical fiber, and the wettability of the solder is increased so that the solder is spread on that metallic coating.

In a case where an optical fiber having an end surface provided with a dielectric film is to be soldered to another member, however, limescale is problematically left on a surface of an optical element present near the soldering portion of the optical fiber, with the result of a decrease in the performance of the optical element.

Specifically, increasing the wettability of solder to spread it on a metallic coating provided on the side surface of an optical fiber requires sufficiently heating the metallic coating in advance. During this step, heat conducted from the metallic coating raises the temperature of a dielectric film provided on an end surface of the optical fiber, which in turn accelerates evaporation of moisture contained in that dielectric film. Such moisture evaporating from the dielectric film condenses on a surface of an optical element present near the soldering portion of the optical fiber. The resulting drops of water contain, for example, dust that lay around the environment and/or dust that adhered to the surface of the optical element. Such dust will remain in the form of limescale on the surface of the optical element to decrease its performance.

A semiconductor laser module, for example, is arranged such that as described above, its optical fiber has a light entry end surface facing the light emission end surface of the semiconductor laser element, the light entry end surface being provided with a dielectric film. Thus, soldering the optical fiber to the housing of the semiconductor laser module leaves limescale on the light emission end surface of the semiconductor laser element as described above. Such limescale left on the light emission end surface of a semiconductor laser element decreases the light emission efficiency of the semiconductor laser element and/or raises the temperature of the semiconductor laser element, with the result of a decrease in the performance of the semiconductor laser element.

Example countermeasures against such a problem include (i) forming on an end surface of the optical fiber a dielectric film that does not easily adsorb moisture (see Patent Literatures 1 and 2) and (ii) heating the dielectric film to dry it immediately before heating the metallic coating. The former countermeasure, however, gives rise to such problems as a decrease in the degree of freedom in selecting a material for the dielectric film and an increase in the cost required for formation of the dielectric film. The latter countermeasure problematically makes it difficult to increase the wettability of solder to spread it on the metallic coating. This is because when the dielectric film is heated to dry, heat is conducted from the dielectric film to the metallic coating to raise its temperature, thereby accelerating oxidation of the metallic coating. The latter countermeasure may further problematically accelerate discoloration of the resin coating for the optical fiber.

The present invention has been accomplished in view of the above problems. It is an object of the present invention to (i) provide a moisture removing method for, without raising the temperature of a metallic coating or resin coating, removing moisture contained in a dielectric film provided on an end surface of an optical fiber and to (ii) provide a method for soldering an optical fiber and a method for producing a semiconductor laser module each of which methods is improved with use of the moisture removing method.

Solution to Problem

In order to solve the above problems, a moisture removing method of the present invention is a moisture removing method for removing moisture contained in a dielectric film provided on a first end surface of an optical fiber, the moisture removing method including a heating step of causing near infrared light to enter the optical fiber through a second end surface to heat the moisture in the dielectric film with use of the near infrared light.

Advantageous Effects of Invention

A moisture removing method of the present invention makes it possible to, without raising the temperature of a metallic coating or resin coating, remove moisture contained in a dielectric film provided on an end surface of an optical fiber.

DESCRIPTION OF EMBODIMENTS

[Moisture Removing Method]

Figure 1:
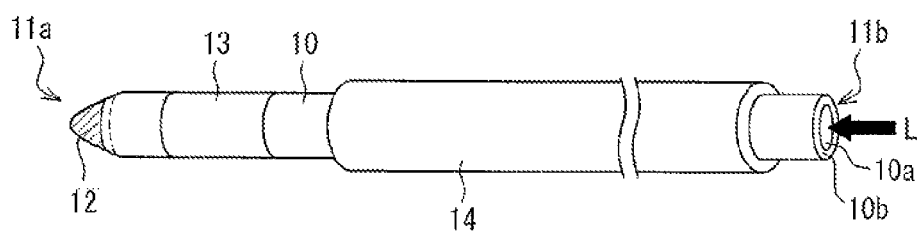
FIG. 1 is a perspective view of an optical fiber for which a moisture removing method of an embodiment of the present invention is to be implemented.

An embodiment of a moisture removing method of the present invention is described below with reference to FIG. 1.

The present embodiment is a moisture removing method for removing moisture contained in a dielectric film 12 provided on a light entry end surface 11a of an optical fiber 10. FIG. 1 is a perspective view of the optical fiber 10.

The optical fiber 10 is a single-cladding fiber including in its cross-sectional structure a core 10a and a cladding 10b surrounding the core 10a. The optical fiber 10 has one end surface (hereinafter referred to also as "first end surface") 11a provided with a dielectric film 12. The optical fiber 10 has a side surface provided with a metallic coating 13 and a resin coating 14.

The dielectric film 12 is a dielectric multilayer film including a plurality of dielectric films stacked on top of one another. The dielectric film 12 serves as an anti-reflection film for preventing the first end surface 11a from reflecting light intended to enter the optical fiber 10. Examples of the material of the dielectric film 12 include (i) fluoride-based materials such as $MgF_2$, $CaF_2$, $BaF_2$, and $CeF_3$, (ii) oxide-based materials such as $Al_2O_3$, SiO, $TiO_2$, and $Gd_2O_3$, (iii) mixture-based materials such as $ZrO_2/TiO_2$ (90:10), $ZrO_2/TiO_2$ (50:50), $ZrO_2/Ta_2O_5$ (70:30), and $TiO_2/Ta_2O_5$ (70:30), and (iv) compound-based materials such as FZ-2.

The metallic coating 13 is a member on which solder with increased wettability is spread when the optical fiber 10 is soldered to another member. The metallic coating 13 is made of gold, for example. The metallic coating 13 is formed through a metal coating process such as plating, and is called "metal coating" as well. The resin coating 14 serves to protect the optical fiber 10, and is made of an ultraviolet curing resin or silicone resin, for example.

The moisture removing method of the present embodiment is for removing moisture contained in the dielectric film 12. The moisture removing method, for such removal, causes near infrared light L to enter the core 10a of the optical fiber 10 through the other end surface (hereinafter referred to also as "second end surface") 11b. Near infrared light is light having a wavelength of not less than 0.7 μm and not greater than 2.5 μm. The present embodiment may use, for example, a super luminescent diode (SLD) or laser diode (LD) as a light source (not shown in FIG. 1) for generating near infrared light.

The near infrared light L, having entered the optical fiber 10 through the second end surface 11b, propagates through the core 10a of the optical fiber 10 to reach the first end surface 11a. The near infrared light L, having reached the first end surface 11a, is absorbed by moisture contained in the dielectric film 12. This is due to water having an absorption spectrum with a plurality of peaks within the wavelength band of near infrared light (that is, not less than 0.7 μm and not greater than 2.5 μm).

The near infrared light L, having been absorbed by moisture contained in the dielectric film 12, raises the temperature of the moisture to accelerate its evaporation, with the result that the moisture contained in the dielectric film 12 is removed rapidly. Heating the moisture with use of near infrared light L as such in a dry atmosphere can prevent moisture in the atmosphere from being adsorbed by the dielectric film 12 again.

The near infrared light L, having entered the core 10a of the optical fiber 10 through the second end surface 11b, does not leak out to the cladding 10b and propagates inside the core 10a. With this arrangement, the near infrared light L, having entered the optical fiber 10 through the second end surface 11b, does not heat the metallic coating 13 or the resin coating 14 both provided on a surface of the optical fiber 10. Thus, the near infrared light L, when heating moisture contained in the dielectric film 12, does not accelerate oxidation of the metallic coating 13 or discoloration of the resin coating 14 as a side effect. The near infrared light L generates heat in the dielectric film 12, which heat is conducted via the optical fiber 10 to the metallic coating 13 and the resin coating 14. Heating moisture contained in the dielectric film 12 with use of near infrared light L for only a short time period (for example, 1 second or less) will, however, cause no significant temperature rise in the metallic coating 13 or resin coating 14. It is also effective to use pulsed near infrared light as the near infrared light L to prevent a significant temperature rise in the metallic coating 13 and the resin coating 14.

The present embodiment causes near infrared light L to enter the core 10a of the optical fiber 10 as an example arrangement. The present invention is, however, not limited to such an arrangement: The present invention may alternatively be arranged such that a portion of the near infrared light L enters the cladding 10b of the optical fiber 10, as long as such a portion of the near infrared light L has sufficiently small power and will cause no considerable temperature rise in the metallic coating 13 or resin coating 14.

The present embodiment involves a single-cladding fiber. The present invention is, however, not limited to such an arrangement: The present invention may alternatively be applied to a multi-cladding fiber including two or more cladding layers. The present embodiment may, in this case, be arranged to prevent near infrared light from entering the outermost cladding layer or sufficiently reduce the power of near infrared light entering the outermost cladding layer. This arrangement makes it possible to, without causing any considerable temperature rise in the metallic coating or resin coating, remove moisture contained in the dielectric film provided at an end surface of the optical fiber.

The light source (such as an SLD or LD) for generating near infrared light L is preferably modularized together with an optical fiber. This is because while connecting the light source to the optical fiber 10 is difficult work that requires precise alignment, connecting, to the optical fiber 10, an optical fiber (hereinafter referred to as "module fiber") drawn out from a module including the light source is easy work that requires no precise alignment. The module fiber and the optical fiber 10 may be connected to each other through, for example, a method of fusing end surfaces thereof to each other or a method of letting such end surfaces butt against each other and holding the ends of the module fiber and optical fiber 10 together with use of a holding member such as a ferrule.

In a case where the present embodiment includes a modularized light source, the module preferably includes a module fiber having a core diameter smaller than that of the optical fiber 10. If the module fiber has a core diameter larger than that of the optical fiber 10, near infrared light having propagated through the core of the module fiber may partially enter the cladding 10b of the optical fiber 10 at the connection point to end up heating the metallic coating 13 and/or the resin coating 14. In the case where the module fiber has a core diameter smaller than that of the optical fiber 10, in contrast, simple alignment can eliminate the above possibility.

[Method for Soldering Optical Fiber]

An embodiment of a soldering method of the present invention is described below with reference to FIGS. 2 and 3.

The present embodiment is a soldering method for soldering the optical fiber 10 to a member 20. FIG. 2 is a perspective view of the optical fiber 10 and the member 20.

Figure 2:
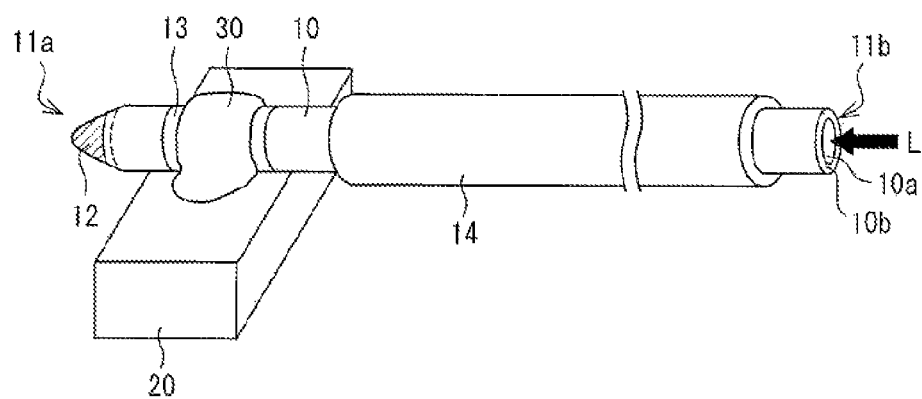
FIG. 2 is a perspective view of an optical fiber and a member for which the soldering method shown in FIG. 3 is to be implemented.

The optical fiber 10 of the present embodiment is a single-cladding fiber similar to the optical fiber 10 illustrated in FIG. 1, and is to be soldered to the member 20 with use of solder 30 as illustrated in FIG. 2. The optical fiber 10 is thus provided with a metallic coating 13 at a portion located over the member 20.

Soldering the optical fiber 10 to the member 20 requires heating the metallic coating 13 to increase the wettability of solder 30 and spread the molten solder 30. When heating the metallic coating 13, the soldering method of the present embodiment removes moisture contained in a dielectric film 12 provided on a light entry end surface 11a of the optical fiber 10 (described below) to avoid leaving limescale on a surface of an optical element present near the dielectric film 12.

Figure 3:
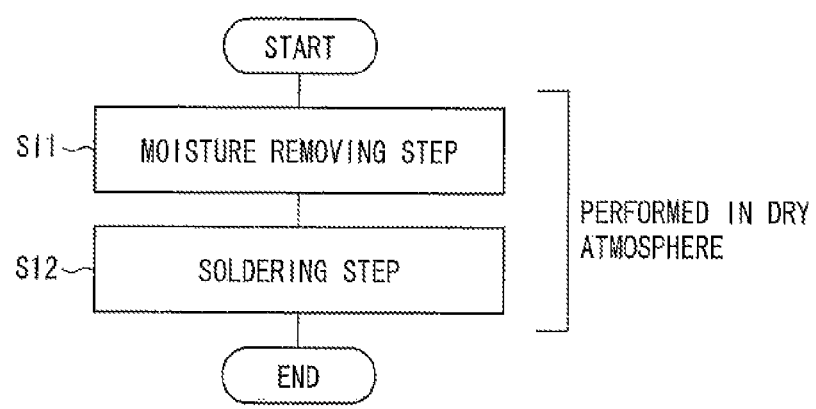
FIG. 3 is a flowchart illustrating the flow of a soldering method of an embodiment of the present invention.

FIG. 3 is a flowchart illustrating the flow of a soldering method of the present embodiment. The soldering method of the present embodiment, as shown in FIG. 3, includes a moisture removing step S11 and a soldering step S12.

The moisture removing step S11 is a step of removing moisture contained in the dielectric film 12 provided on the first end surface 11a of the optical fiber 10. The moisture removing step S11 is performed by causing near infrared light L to enter the optical fiber 10 through a second end surface 11b to heat moisture in the dielectric film 12 with use of the near infrared light L. Heating moisture in the dielectric film 12 with use of the near infrared light L can remove the moisture from the dielectric film 12 as described above.

The soldering step S12 is a step of soldering the optical fiber 10 to the member 20. The soldering step S12 includes (1) a sub-step of heating the metallic coating 13 of the optical fiber 10 and the member 20, (2) a sub-step of spreading solder 30, which has wettability increased as the result of the sub-step (1) and which is thus in a molten state, on the member 20 to bury in the solder 30 a corresponding portion of the optical fiber 10, and (3) a sub-step of (naturally) cooling the molten solder 30. These sub-steps cause the optical fiber 10 to be soldered to the member 20.

What is notable about the soldering method of the present embodiment is the arrangement of performing the moisture removing step S11 before performing the soldering step S12. If the soldering step S12 is performed without the moisture removing step S11 being performed in advance, the soldering step S12 will heat the metallic coating 13 with the dielectric film 12 containing moisture. This causes the concern that the moisture evaporating from the dielectric film 12 will leave limescale on a surface of an optical element present near the dielectric film 12. On the other hand, in the case where the moisture removing step S11 is performed before the soldering step S12 is performed, the soldering step S12 heats the metallic coating 13 with the dielectric film 12 in a dried state. This eliminates the concern that the moisture evaporating from the dielectric film 12 will leave limescale on a surface of an optical element present near the dielectric film 12.

The moisture removing step S11 and the soldering step S12 are preferably performed in a dry atmosphere as shown in FIG. 3 for the following reason: If the moisture removing step S11 and the soldering step S12 are performed in the normal atmosphere, moisture in the atmosphere may be adsorbed by the dielectric film 12 again between the time of performing the moisture removing step S11 and the time of performing the soldering step S12. In the case where the moisture removing step S11 and the soldering step S12 are performed in a dry atmosphere, in contrast, it is possible to prevent moisture in the atmosphere from being adsorbed by the dielectric film 12 again.

The term "dry atmosphere" as used herein generally refers to an atmosphere having a lower dew point (containing less moisture) than that of the environmental atmosphere. The above-described effect is clearly achievable under a condition managed so that the atmosphere in which the moisture removing step S11 and the soldering step S12 are performed has a dew point lower than that of the environmental atmosphere. To achieve a more remarkable effect, the dry atmosphere preferably has a dew point of −20° C. or lower. In a case where, for instance, the moisture removing step S11 and the soldering step S12 are performed in a dry atmosphere having a dew point of −20° C. or lower, there is no risk of limescale being left on a surface of an optical element near the dielectric film 12 as long as the soldering step S12 is performed within 1 hour of the time of performing the moisture removing step S11.

In addition, the dry atmosphere in which the moisture removing step S11 and the soldering step S12 are performed is more preferably a dry atmosphere (such as a nitrogen atmosphere or argon atmosphere) having an oxygen concentration lower than that of the environmental atmosphere. This is because in the case where the soldering step S12 is performed in a dry atmosphere having an oxygen concentration lower than that of the environmental atmosphere, it is possible to reduce oxidation of the solder in comparison to a case where the soldering step S12 is performed in a dry atmosphere having such an oxygen concentration as that of the environmental atmosphere. To achieve a more remarkable effect, the dry atmosphere in which the moisture removing step S11 and the soldering step S12 are performed is preferably a dry atmosphere having an oxygen concentration of 500 ppm or lower, more preferably a dry atmosphere having an oxygen concentration of 100 ppm or lower.

[Method for Producing Semiconductor Laser Module]

An embodiment of a production method of the present invention is described below with reference to FIGS. 4 through 6.

The present embodiment is a production method for producing a semiconductor laser module 40. FIG. 4 is a perspective view of the semiconductor laser module 40. FIG. 5 is a side view of an optical fiber 10 included in the semiconductor laser module 40. FIG. 5 shows, other than the optical fiber 10, dotted lines to indicate members of the semiconductor laser module 40 other than the optical fiber 10.

Figure 4:
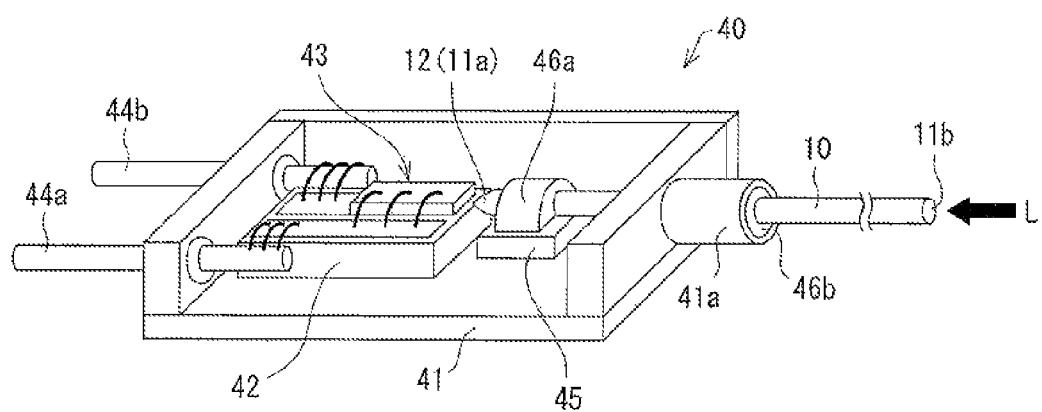
FIG. 4 is a perspective view of a semiconductor laser module to be produced through the production method shown in FIG. 6.

As illustrated in FIG. 4, the semiconductor laser module 40 includes, other than the optical fiber 10, a housing 41, a laser mount 42, a semiconductor laser element 43, electrode rods 44a and 44b, and a fiber mount 45. FIG. 4 omits the top plate and one of the side plates of the housing 41 to clearly illustrate the internal structure of the semiconductor laser module 40.

The housing 41 is a cuboid case for containing the semiconductor laser element 43. The optical fiber 10 is drawn into the housing 41 through a penetration pipe 41a provided at a frontal side plate of the housing 41. The electrode rods 44a and 44b are each drawn into the housing 41 through a through-hole provided at a back side plate of the housing 41.

The laser mount 42 is a base on which the semiconductor laser element 43 is placed, and is fixed to the bottom plate of the housing 41. The laser mount 42 has a top surface provided with two metal plates (first and second metal plates) insulated from each other. The first metal plate is wire-bonded to the electrode rod 44a, whereas the second metal plate is wire-bonded to the electrode rod 44b.

The semiconductor laser element 43 is placed above the top surface of the laser mount 42. Such placement involves (i) bonding the bottom surface of the semiconductor laser element 43 to the second metal plate and (ii) wire-bonding the top surface of the semiconductor laser element 43 to the first metal plate, thereby forming a current path for a drive current.

The fiber mount 45 is a base on which the optical fiber 10 is placed, and is fixed to the bottom plate of the housing 41. The fiber mount 45 has a height that allows the semiconductor laser element 43 to have a light emission end surface facing the light entry end surface 11a of the optical fiber 10.

Figure 5:
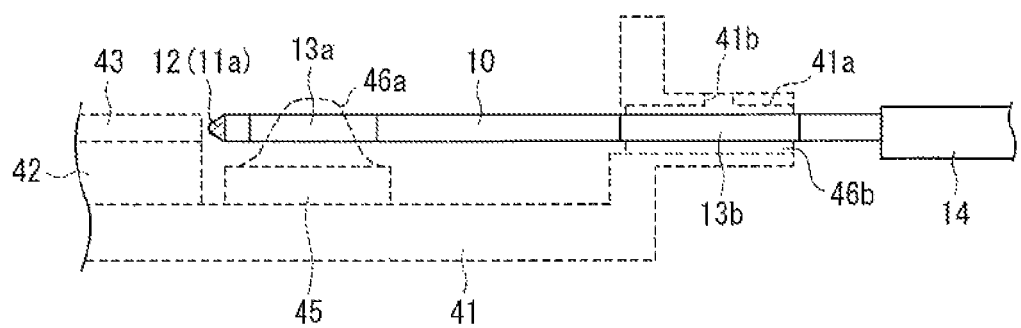
FIG. 5 is a side view of an optical fiber included in the semiconductor laser module illustrated in FIG. 4.

The optical fiber 10 of the present embodiment is a single-cladding fiber similar to the optical fiber 10 illustrated in FIG. 1, and is to be soldered to the fiber mount 45 and the penetration pipe 41a with use of solder 46a and solder 46b respectively as illustrated in FIG. 5. The optical fiber 10 is thus provided with metallic coatings 13a and 13b respectively at a portion located over the fiber mount 45 and at a portion located inside the penetration pipe 41a.

Soldering the optical fiber 10 to the fiber mount 45 requires heating the metallic coating 13a to increase the wettability of solder 46a and spread the molten solder 46a. When heating the metallic coating 13a, the production method of the present embodiment removes moisture contained in a dielectric film 12 provided on a light entry end surface 11a of the optical fiber 10 (described below) to avoid leaving limescale on the light emission end surface of the semiconductor laser element 43.

Figure 6:
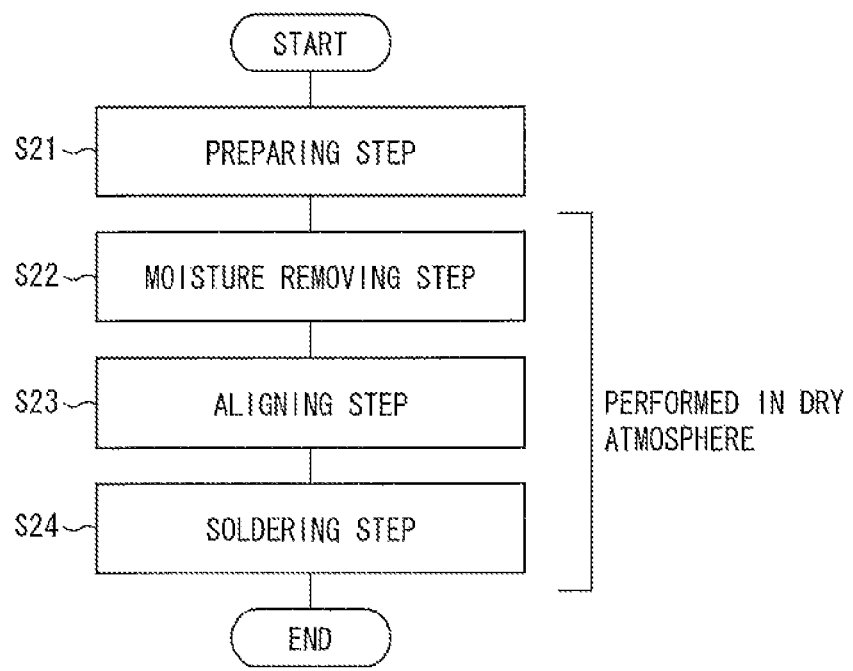
FIG. 6 is a flowchart illustrating the flow of a production method of an embodiment of the present invention.

FIG. 6 is a flowchart illustrating the flow of a production method of the present embodiment. The production method of the present embodiment, as shown in FIG. 6, includes a preparing step S21, a moisture removing step S22, an aligning step S23, and a soldering step S24.

The preparing step S21 includes performing such sub-steps as (1) attaching the laser mount 42 and the fiber mount 45 to the housing 41, (2) attaching the semiconductor laser element 43 to the laser mount 42, (3) drawing the electrode rods 44a and 44b into the housing 41, (4) wire-bonding the electrode rods 44a and 44b to the laser mount 42, and (5) drawing the optical fiber 10 into the housing 41. The sub-step of drawing the optical fiber 10 into the housing 41 may alternatively be performed after the moisture removing step S22 described below.

The moisture removing step S22 is a step of removing moisture contained in the dielectric film 12 provided on the light entry end surface 11a of the optical fiber 10. The moisture removing step S22 is performed by causing near infrared light L to enter the optical fiber 10 through a light emission end surface 11b to heat moisture in the dielectric film 12 with use of the near infrared light L. Heating moisture in the dielectric film 12 with use of the near infrared light L can remove the moisture from the dielectric film 12 as described above. The near infrared light L has a wavelength larger than the lasing wavelength of the semiconductor laser element 43, which means that the near infrared light L has an energy per photon which energy is smaller than that of laser light that the semiconductor laser element 43 outputs. The semiconductor laser element 43, therefore, does not absorb near infrared light L to generate heat.

The moisture removing step S22 is preferably performed with the light entry end surface 11a of the optical fiber 10 separated from the light emission end surface of the semiconductor laser element 43 by a distance of 1 mm or greater. This arrangement makes it possible to more effectively prevent the moisture, which has been removed from the dielectric film 12 during the moisture removing step S22, from adhering to the light emission end surface of the semiconductor laser element 43.

The aligning step S23 is a step of adjusting the relative position of the light entry end surface 11a of the optical fiber 10 with respect to the light emission end surface of the semiconductor laser element 43 to maximize the coupling efficiency. The aligning step S23 is performed by, for instance, repeating (i) a measurement of the output power of the optical fiber 10 (that is, the power of laser light outputted from the light emission end surface 11b) and (ii) a relocation of the light entry end surface 11a of the optical fiber 10 until the output power is maximized.

The soldering step S24 is a step of soldering the optical fiber 10 to the fiber mount 45 and the penetration pipe 41a.

The soldering step S24 includes (a1) a sub-step of heating the metallic coating 13a of the optical fiber 10 and the fiber mount 45, (a2) a sub-step of spreading solder 46a, which has wettability increased as the result of the sub-step (a1) and which is thus in a molten state, on the fiber mount 45 to bury in the solder 46a a corresponding portion of the optical fiber 10, and (a3) a sub-step of (naturally) cooling the molten solder 46a. These sub-steps cause the optical fiber 10 to be soldered to the fiber mount 45. The soldering step S24 further includes (b1) a sub-step of heating the metallic coating 13b of the optical fiber 10 and the penetration pipe 41a, (b2) a sub-step of spreading solder 46b, which has wettability increased as the result of the sub-step (b1) and which is thus in a molten state, inside the penetration pipe 41a to bury in the solder 46b a corresponding portion of the optical fiber 10, and (b3) a sub-step of (naturally) cooling the molten solder 46b. These sub-steps cause the optical fiber 10 to be soldered to the penetration pipe 41a.

What is notable about the production method of the present embodiment is the arrangement of performing the moisture removing step S22 before performing the soldering step S24. If the soldering step S24 is performed without the moisture removing step S22 being performed in advance, the soldering step S24 heats the metallic coatings 13a and 13b with the dielectric film 12 containing moisture. This causes the concern that the moisture evaporating from the dielectric film 12 will leave limescale on the light emission end surface of the semiconductor laser element 43. On the other hand, in the case where the moisture removing step S22 is performed before the soldering step S24 is performed, the soldering step S24 heats the metallic coatings 13a and 13b with the dielectric film 12 in a dried state. This eliminates the concern that the moisture evaporating from the dielectric film 12 will leave limescale on the light emission end surface of the semiconductor laser element 43.

The moisture removing step S22 through the soldering step S24 are preferably performed in a dry atmosphere as shown in FIG. 6 for the following reason: If the moisture removing step S22 through the soldering step S24 are performed in the normal atmosphere, moisture in the atmosphere may be adsorbed by the dielectric film 12 again between the time of performing the moisture removing step S22 and the time of performing the soldering step S24. In the case where the moisture removing step S22 through the soldering step S24 are performed in a dry atmosphere, in contrast, it is possible to prevent moisture in the atmosphere from being adsorbed by the dielectric film 12 again. In a case where the moisture removing step S22 through the soldering step S24 are performed in a dry atmosphere having a dew point of −20° C. or lower, it is possible to avoid leaving limescale on the light emission end surface of the semiconductor laser element 43 as long as the soldering step S24 is performed within 1 hour of the time of performing the moisture removing step S22.

The present embodiment is arranged to fix the semiconductor laser element 43 to the bottom plate of the housing 41 with the laser mount 42 therebetween. The present invention is, however, not limited to such an arrangement: The present invention may alternatively be arranged to omit including the laser mount 42 and fix the semiconductor laser element 43 directly to the bottom plate of the housing 41. Further, the present embodiment is arranged to fix the optical fiber 10 to the bottom plate of the housing 41 with the fiber mount 45 therebetween. The present invention is, however, not limited to such an arrangement: The present invention may alternatively be arranged to omit including the fiber mount 45 and fix the optical fiber 10 directly to the bottom plate of the housing 41.

[Recap]

As described above, the moisture removing method of the present embodiment is a moisture removing method for removing moisture contained in a dielectric film provided on a first end surface of an optical fiber, the moisture removing method including a heating step of causing near infrared light to enter the optical fiber through a second end surface to heat the moisture in the dielectric film with use of the near infrared light.

The above arrangement makes it possible to, without raising the temperature of a metallic coating or resin coating, remove moisture contained in a dielectric film provided on an end surface of an optical fiber. The heating step may include: a sub-step of disposing the optical fiber on a path of the near infrared light so that the near infrared light enters the optical fiber through the second end surface; and a sub-step of causing the near infrared light to enter the optical fiber through the second end surface. The heating step may alternatively include: a sub-step of disposing, on a side of the second end surface of the optical fiber, a light source for emitting the near infrared light; and causing the light source to emit the near infrared light so that the near infrared light enters the optical fiber through the second end surface.

The moisture removing method of the present embodiment may preferably be arranged such that the heating step is performed in an atmosphere that has a dew point lower than a dew point of an environmental atmosphere.

The above arrangement can, in comparison to a case where the heating step is performed in the environmental atmosphere, reduce the amount of moisture adsorbed again by the dielectric film provided on the end surface of the optical fiber.

The moisture removing method of the present embodiment may preferably be arranged such that the heating step is performed in an atmosphere that has the dew point lower than the dew point of the environmental atmosphere and that has an oxygen concentration lower than an oxygen concentration of the environmental atmosphere.

The above arrangement can prevent oxidation of the solder in a case where the heating step is performed before the soldering step of soldering the optical fiber to another member.

As described above, the soldering method of the present embodiment is an optical fiber soldering method for soldering an optical fiber having a first end surface provided with a dielectric film to another member, the optical fiber soldering method including: a removing step of removing moisture in the dielectric film through the moisture removing method; and a soldering step of soldering the optical fiber to the other member after the removing step.

The above arrangement can prevent the moisture, contained in the dielectric film provided on the end surface of the optical fiber, from leaving limescale on a surface of an optical element present near the dielectric film.

As described above, the method of the present embodiment for producing a semiconductor laser module is a method for producing a semiconductor laser module including a semiconductor laser element and an optical fiber having a light entry end surface facing a light emission end surface of the semiconductor laser element, the light entry end surface being provided with a dielectric film, the method including: a removing step of removing moisture in the dielectric film through the moisture removing method; and a soldering step of soldering the optical fiber to a housing of the semiconductor laser module after the removing step.

The above arrangement can prevent the moisture, contained in the dielectric film provided on the end surface of the optical fiber, from leaving limescale on the light emission end surface of the semiconductor laser element.

As described above, the moisture removing method of the present embodiment makes it possible to, without raising the temperature of a metallic coating or resin coating, remove moisture contained in a dielectric film provided on an end surface of an optical fiber. The soldering method of the present embodiment makes it possible to solder an optical fiber to another member without leaving limescale on a surface of an optical element present near the dielectric film. The production method of the present embodiment makes it possible to produce a semiconductor laser module without leaving limescale on the light emission end surface of the semiconductor laser element.

[Supplemental Notes]

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is applicable to production of any of various devices that includes an optical fiber. The present invention is particularly suitably applicable to production of a semiconductor laser module.

REFERENCE SIGNS LIST 10 optical fiber
10a core
10b cladding
11a first end surface (one end surface, light entry surface)
11b second end surface (the other end surface, light emission end surface)
12 dielectric film
13 metallic coating
14 resin coating
20 member (another member)
40 semiconductor laser module
43 semiconductor laser element

The invention claimed is:

1. A moisture removing method for removing moisture contained in a dielectric film provided on a first end surface of an optical fiber, the moisture removing method comprising:
a heating step of causing near infrared light to enter the optical fiber through a second end surface disposed opposite to the first end surface to heat the moisture in the dielectric film with use of the near infrared light to remove the moisture in the dielectric film.

2. The moisture removing method according to claim 1, wherein
the heating step is performed in an atmosphere that has a dew point lower than a dew point of the surrounding atmosphere.

3. The moisture removing method according to claim 2, wherein
the heating step is performed in an atmosphere that has the dew point lower than the dew point of the surrounding atmosphere and that has an oxygen concentration lower than an oxygen concentration of the surrounding atmosphere.

4. The moisture removing method according to claim 1, wherein
the heating step is a step of causing the near infrared light to enter a core of the optical fiber through the second end surface to heat the moisture in the dielectric film with use of the near infrared light having propagated through the core.

5. An optical fiber soldering method for soldering an optical fiber having a first end surface provided with a dielectric film to another member, the optical fiber soldering method comprising:
a removing step of removing moisture in the dielectric film through the moisture removing method according to claim 1; and
a soldering step of soldering the optical fiber to the other member after the removing step.

6. A method for producing a semiconductor laser module including a semiconductor laser element and an optical fiber having a light entry end surface facing a light emission end surface of the semiconductor laser element, the light entry end surface being provided with a dielectric film, the method comprising:
a removing step of removing moisture in the dielectric film through the moisture removing method according to claim 1; and
a soldering step of soldering the optical fiber to a housing of the semiconductor laser module after the removing step.

* * * * *